United States Patent [19]

Kim

[11] Patent Number: 5,533,117
[45] Date of Patent: Jul. 2, 1996

[54] LINE STATUS INDICATOR FOR USE WITH TELEPHONES SHARING A SINGLE LINE

[75] Inventor: Chong H. Kim, 16807 Woodridge Cir., Fountain Valley, Calif. 92708

[73] Assignee: Chong H. Kim, Fountain Valley, Calif.

[21] Appl. No.: 101,203

[22] Filed: Aug. 3, 1993

[51] Int. Cl.⁶ .................................................. H04M 1/00
[52] U.S. Cl. ...................... 379/377; 379/376; 379/396; 379/164
[58] Field of Search ....................... 379/377, 396, 379/376, 188, 194, 195, 164, 387, 441, 442

[56]  References Cited

U.S. PATENT DOCUMENTS

| 3,906,168 | 9/1975 | McEowen | 379/164 X |
| 3,944,752 | 3/1976 | Stearn et al. | 379/442 |
| 4,031,333 | 6/1977 | Fouratt | 379/396 X |
| 4,169,217 | 9/1979 | Szanto et al. | 379/396 |
| 4,228,324 | 10/1980 | Rasmussen et al. | 379/164 X |
| 4,546,214 | 8/1985 | Laing | 379/396 X |
| 4,653,094 | 3/1987 | Rasmussen et al. | 379/396 |
| 4,723,279 | 2/1988 | Field | 379/396 |
| 4,899,372 | 2/1990 | Wahi et al. | 379/194 |
| 5,210,791 | 5/1993 | Krasik | 379/396 X |

FOREIGN PATENT DOCUMENTS 3041975   5/1982   Germany ........................... 379/194

*Primary Examiner*—Jeffery Hofsass
*Assistant Examiner*—Jack Chiang

[57]  ABSTRACT

The present invention relates to home telephone accessary and more specifically to an accessary that turns on a green light and a buzzer when the home phone line is open, and a red light when the line is in use. This invention is useful especially for those who share one telephone line with many other people.

1 Claim, 2 Drawing Sheets

LINE STATUS INDICATOR FOR USE WITH TELEPHONES SHARING A SINGLE LINE

BACKGROUND OF THE INVENTION

The present invention relates to home telephone accessary and more specifically to an accessary that turns on a green light and a buzzer when the home phone line is open, and a red light when the line is in use. This invention is useful especially for those who share one telephone line with many other people. Many families in the United States have more than one telephone but use only one telephone line (or number). This sometime causes frustration in phone usage particularly when the family has teenagers. In general, teenagers use telephone more often and longer time. In addition, they want privacy in their phone conversation and dislike parent's phone interference as often parents do pick up the phone and listen to the conversation to find out whether the phone line is in use or not. This invention eliminates the need for parents to pick up the phone and listen to the phone conversation.

SUMMARY OF THE INVENTION

The Home Phone Line Checker is an electronic device that measures voltage level in the home telephone line without phone interference, and then by comparing the voltage level against some reference voltage it determines whether the phone line is in use or not. An electronic circuit that performs the function described above is enclosed in a small plastic box. This device is equipped with female and male telephone plugs so that it can be installed easily by plugging the telephone line (from the wall) into female plug of the Home Phone Line Checker and its male plug into the telephone female plug (see FIG. 1). A possible embodiment of the plastic box is shown in FIG. 2. The top of the electronic box comprises a flat plastic surface with two holes for two switches and two holes for two LED lights. One of the switches is the main switch, and the other one is a buzzer switch. When the user desires to find out whether the phone line is in use or not, the user turns on the main switch. If the phone line is in use, then a red LED light will be on, otherwise a green LED light will be on. If the buzzer switch was on, then the buzzer will be activated as the green light is on. The buzzer is particularly useful when one is waiting for phone line while doing some thing else. In this case, just leave the main switch and the buzzer switch on. Then when the phone line becomes available, it automatically turns on the green LED light, and at the same time the buzzer. The buzzer sound enables one to know that the phone line is available from a distance. The features and usefulness of the present invention will become apparent from the following detailed description of the invention when read with the accompanying drawings.

DETAILED DESCRIPTION

Figure 1:
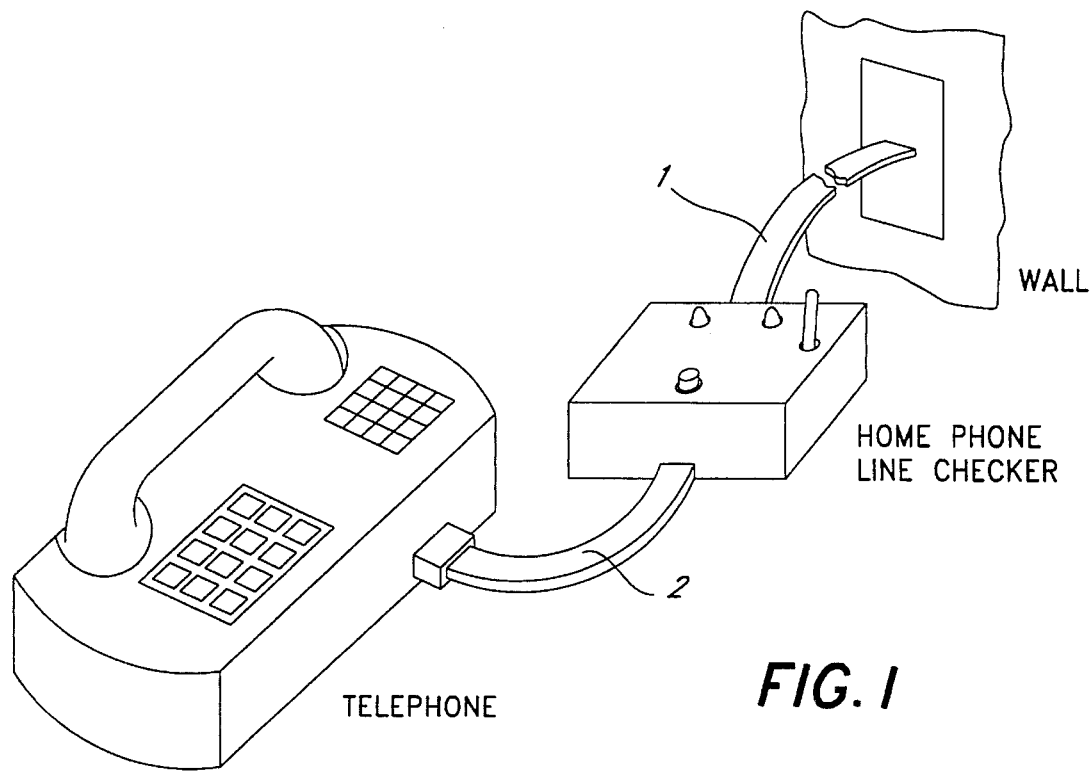
FIG. 1 is a preferred perspective view showing how the Home Phone Line Checker is connected to the phone.

A preferred embodiment of the present invention will now be described in connection with FIGS. 1, 2, and 3 of the drawing.

FIG. 1 shows how to install the Home Phone Line Checker. The telephone line (1) from the wall is plugged in the back of the electronic box, and then the line (2) from the box is plugged in the telephone. As shown in the figure, it is placed near the telephone.

Figure 2:
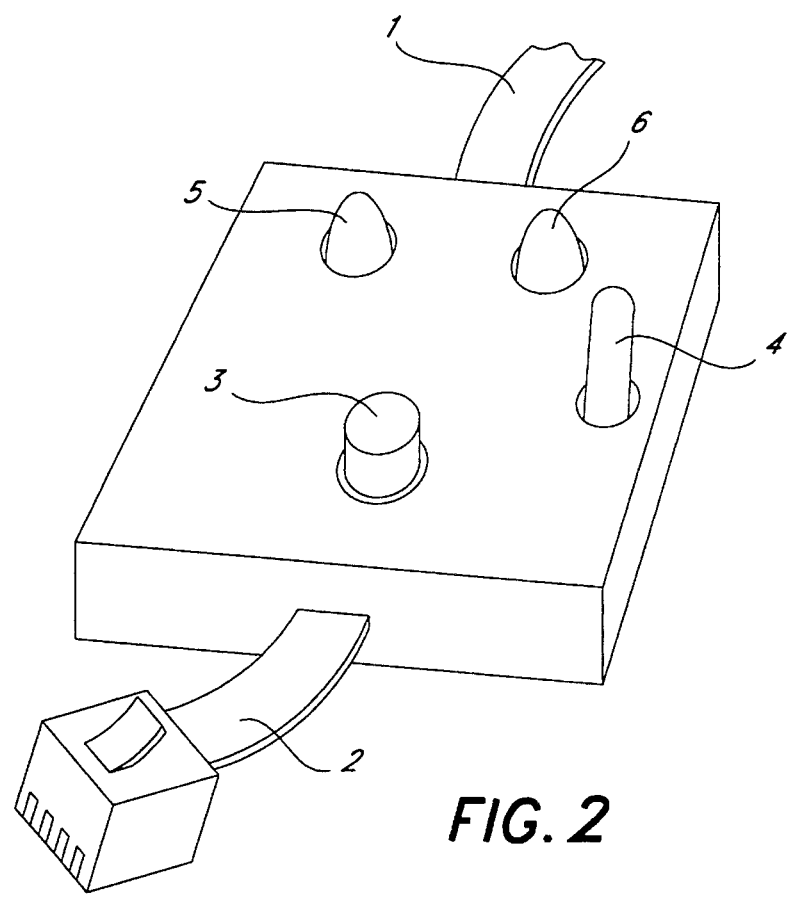
FIG. 2 shows a preferred top view of the electronic box.

FIG. 2 shows a preferred top view of the Home Phone Line Checker electronic box. It comprises two switches and two LED lights. The switch (3) at the lower middle is the main switch. The switch (4) at the right side is the buzzer switch which provides user an option of either activating or deactivating the buzzer when the phone line becomes available. This feature is particularly useful when some one is using the phone for a long time in his or her room. In this situation, connect the Home Phone Line Checker to the phone that user desires to use and leave the main switch and the buzzer switch on. Then as the person finishes the phone conversation and hangs up the phone, the green LED light (5) will be on, and at the same time the buzzer will be activated so that the user can know that the phone line is available from a distance. If user desires not to use the buzzer, then leave the buzzer switch off. The LED light (6) in the upper right side is a red LED which is to be on if the phone line is in use. When the Home Phone Line Checker is not used, then leave the main switch off. This will save the 9 volt battery.

Figure 3:
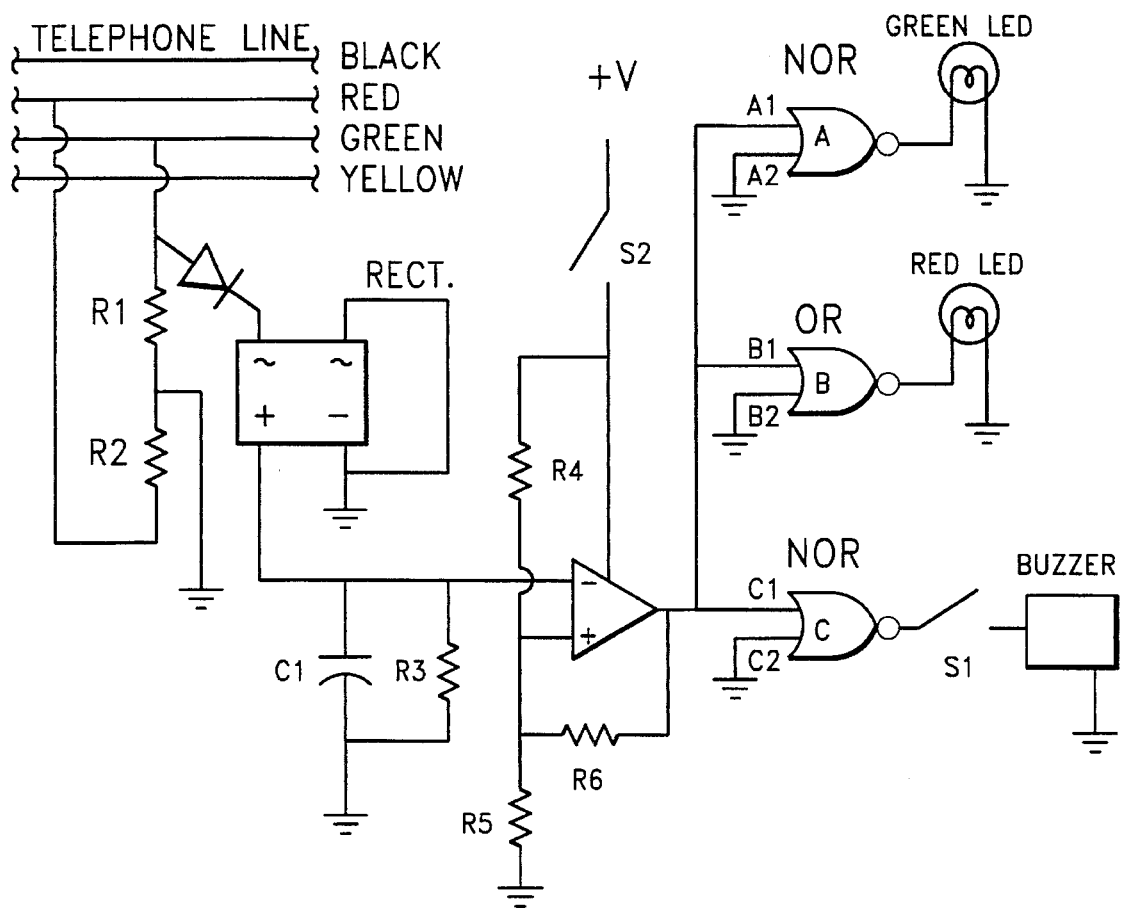
FIG. 3 describes a preferred electronic circuit.

FIG. 3 describes how the electronic circuit works. At the top left corner of FIG. 3, four wires are shown representing the telephone line. From the green colored wire of the telephone line, an wire is tapped to draw signal from the phone line to the circuit. The tapped signal passes through a diode D1 (1N34A or similar), which is placed here to pass forward current and block reverse current. A voltage balancing circuit that comprises two resistors R1 (about 1 mega ohms) and R2 (about 5 mega ohms) balances the voltage difference between the telephone line (48 volts) and Home Phone Line Checker circuit (about 9 volts), which are also placed there to meet the FCC requirement of part 68. The signal passed through the diode D1 is rectified by RECT and then smoothed by an RC circuit that comprises a set of capacitor C1 (about 10 micro farad) and resistor R3 (about 500 kilo ohms), which also determines the time constant of the signal. The smoothed signal is then amplified by an amplifier AMP (LM 1458 or similar operational amplifier). A voltage divider circuit that comprises resistors R4 (about 10 kilo ohms) and R5 (about 2.2 kilo ohms) provides a reference voltage for the amplifier. The feedback resistor R6 (about 10 mega ohms) determines the level of amplification. The amplified signal is then sent to a logical decision block that comprises three logic gates: NOR gate A, OR gate B, and NOR gate C. When the phone line is not in use, the voltage levels at the inputs A1, B1, and C1 are low (about 0.3 volts). The low causes outputs of NOR gates A and C high (about 6 volts) and it turns on the green LED light indicating that the phone line is open, and at the same time the buzzer (9 volt buzzer) will be activated if the buzzer switch S1 is on. The output of the OR gate remains low (about 0.3 volts), which keeps the red LED light off. When the phone line is in use, the voltage levels at the inputs A1, B1, and C1 are high (about 6 volts), and it causes outputs of the NOR gates A and C low (about 0.3 volts), and consequently it turns off the green LED light and the buzzer at the same time. But the output of the OR gate is high (about 6 volts) and it turns on the red LED light. Note that A2, B2, and C2 are grounded all the time. The switch S2 is the main switch that turns on and off the power source.

I claim:

1. A means of accessing and reporting telephone line-status by use of a voltage divider comprising two resistors designated as a first resistor and a second resistor, one end of the first resistor being connected to a wire inside a green colored conduit within a telephone line and to an input of a diode, and the other end of said first resistor being connected to one end of the second resistor and to the ground, the other end of said second resistor being connected to a wire inside a red conduit within said telephone line, an output of said diode being connected to an input of a full-wave bridge rectifier, an output of said full-wave bridge rectifier being connected to a signal-smoothing RC circuit that consists of one capacitor and one resistor, an output of said signal-smoothing rectifier being connected to an input of a voltage amplifier that has one feedback resistor and a voltage reference input from a voltage divider circuit, the divider circuit consists of two resistors designated as a first resistor and a second resistor, one end of the first resistor of the divider circuit connected to a voltage source, the other end of said first resistor of the divider circuit connected to a voltage amplification IC chip reference voltage input pin and to one end of the second resistor of said divider circuit, the other end of said second resistor of the divider circuit connected to said ground, an output of said voltage amplifier being connected to first, second and third Information displaying circuits, the output of the voltage amplifier being connected to a NOR gate of the first displaying circuit, the output of said NOR gate connected to a green colored LED, the output of said voltage amplifier connected to an OR gate of the second displaying circuit, the output of said OR gate connected to a red colored LED, the output of said voltage amplifier connected to a NOR gate of the third displaying circuit, the output of said NOR gate connected to a switch, and an output of said switch connected to a buzzer.

\* \* \* \* \*